Sept. 19, 1967 W. C. MILLER ETAL 3,342,942

PARTY LINE EXCHANGE WITH INTERWORKING
OF DIFFERENT TYPE SWITCHING UNITS

Filed June 5, 1964 10 Sheets-Sheet 1

INVENTORS
WILLIAM C. MILLER
FRANK B. SIKORSKI

BY C. R. Gulbrandsen
ATTY.

Sept. 19, 1967 W. C. MILLER ETAL 3,342,942

PARTY LINE EXCHANGE WITH INTERWORKING OF DIFFERENT TYPE SWITCHING UNITS

Filed June 5, 1964 10 Sheets-Sheet 2

Sept. 19, 1967 W. C. MILLER ETAL 3,342,942

PARTY LINE EXCHANGE WITH INTERWORKING OF DIFFERENT TYPE SWITCHING UNITS

Filed June 5, 1964 10 Sheets-Sheet 3

Sept. 19, 1967 W. C. MILLER ETAL 3,342,942

PARTY LINE EXCHANGE WITH INTERWORKING OF DIFFERENT TYPE SWITCHING UNITS

Filed June 5, 1964 10 Sheets-Sheet 4

Sept. 19, 1967 W. C. MILLER ETAL 3,342,942

PARTY LINE EXCHANGE WITH INTERWORKING OF DIFFERENT TYPE SWITCHING UNITS

Filed June 5, 1964 10 Sheets-Sheet 5

Sept. 19, 1967 W. C. MILLER ETAL 3,342,942

PARTY LINE EXCHANGE WITH INTERWORKING OF DIFFERENT TYPE SWITCHING UNITS

Filed June 5, 1964 10 Sheets-Sheet 7

United States Patent Office 3,342,942

Patented Sept. 19, 1967

3,342,942

PARTY LINE EXCHANGE WITH INTERWORKING OF DIFFERENT TYPE SWITCHING UNITS

William C. Miller, Glen Ellyn, and Frank B. Sikorski, Des Plaines, Ill., assignors to Automatic Electric Laboratories, Inc., Northlake, Ill., a corporation of Delaware Filed June 5, 1964, Ser. No. 373,032
13 Claims. (Cl. 179—16)

ABSTRACT OF THE DISCLOSURE

Common control and step-by-step switches provide service in the same telephone office. Subscribers moving from one party line to another may keep the same directory number, in the common control unit with terminal-per-line and full translation service, and in the step-by-step unit with terminal-per-station service. Common control and step-by-step stations may be mixed on the same party line, there being a special adapter provided to repeat the busy marking between the common control circuit and the step-by-step line circuit. The mixed office is also provided with reverting call, routiner, verification, and wire chief features in common for the two types of switching units.

This invention relates to a party line exchange with interworking of switching units of basically different structure and control, and more particuarly to an exchange in which one switching unit is of the direct controlled type, and another switching unit is of the marker controlled type having common control equipment including a translator, with each switching unit arranged for party line service of the type in which subscribers having unrelated directory numbers may be assigned stations on the same line.

In telephone exchanges the requirements of direct dialing of all local, extended area, and toll calls, and provisions of new services such as call transfer, abbreviated dialing, home extension intercom, series completion to an idle one of a group of telephones which may be at different locations, etc. are best provided by a common control type switching system. However many telephone exchanges are equipped with direct-controlled type switching systems which still have many years of serviceable life. When there is a need to add or replace equipment, economics does not justify replacing an entire usable office. Therefore it is desirable that in many situations common control switching equipment be added along side of the existing direct-controlled switching equipment. However using two different types of switching equipment together in the same office raises a problem of compatibility. That calls can be completed between switching equipment of different types has been established by many working examples, and the technique most commonly used is that of connecting adapters or trunk circuits between the switching units of different type, maintaining different office codes for each. Such arrangements, however, fall short of the objective of compatibility as desired by those who have the responsibility of operating telephone exchanges. Their objectives in desiring compatibility includes the ability to add to existing equipment without the necessity of instituting a new office code, the ability to move or group any directory numbers with any lines within the combined office, compatibility of signaling and supervisory techniques for both the existing and new equipment interconnectoins between the two types of equipments which permit flexible and economic use of the equipment and making possible regrading and opening of new selector levels without undue inconvenience, and the ability to use existing trunks without modifications with the new equipment as well as the existing.

The object of this invention is to provide an exchange having both direct-controlled switching equipment and common-controlled switching equipment with the ability to move or group any directory numbers with any lines within the combined office. In direct access step-by-step offices the ability of subscribers to move from one party line to another without change of directory number is provided by terminal-per-station service in which there is a connector terminal provided for each directory number, and these terminals are grouped on a line intermediate distributing frame to form a party line, which is connected by way of the main distributing frame to the outside line which extends to the station locations of the subscribers thereon. One commonly used arrangement is that shown in U.S. Patent No. 1,727,133 by R. G. Richardson et al., "Party-Line Automatic Telephone System," issued Sept. 3, 1929.

In a common control switching system the ability of subscribers to move from one party line to another without change of directory number is achieved by the use of a translator which during the setting up of a call receives the dialed directory number and translates it into a line terminal equipment location number, and the connection is established in accordance with the translated equipment number. The translated information includes line terminal equipment information which is the same for all parties on the same line, and party signaling information which is different for each party on the line. With this arrangement no line intermediate distributing frame is required. When a subscriber moves from one line to another it is merely necessary to make a change in the translator to indicate the new switching information needed. One such system is that disclosed in U.S. patent application Ser. No. 230,887 filed Oct. 16, 1962 by K. K. Spellnes for a Communication Switching System, now Patent No. 3,170,041.

According to the invention a switching exchange is provided having a direct controlled step-by-step switching unit with connector switches of the terminal-per-station type, and a common control switching unit having switching stages controlled by makers and which provides for translation of the subscriber directory number, and comprising apparatus for facilitating the move of a station from a line connected to one of these switching units to a line connected to the other switching unit without change in directory number, using adapters connectable between the control conductors of the corresponding terminals of the two units to repeat a busy mark at either terminal to the other terminal. With this arrangement the line circuit and terminating switching equipment of each switching unit may be of the optimum design for that switching unit, even though the busy marking principles of the two units are completely different.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 to 12 wherein:

FIGS. 1 and 2 comprise a symbolic block diagram of a party line telephone system having a direct access step-by-step switching unit and a crosspoint common control switching unit;

FIG. 3 is a schematic diagram of a step-by-step connector and line distributing frame arrangement for terminal-per-station party line service;

FIGS. 4–8 comprise a functional block and schematic diagram of a crosspoint switching network line group and line group marker of the common control system;

EXCHANGE DIAGRAM

Figure 1:
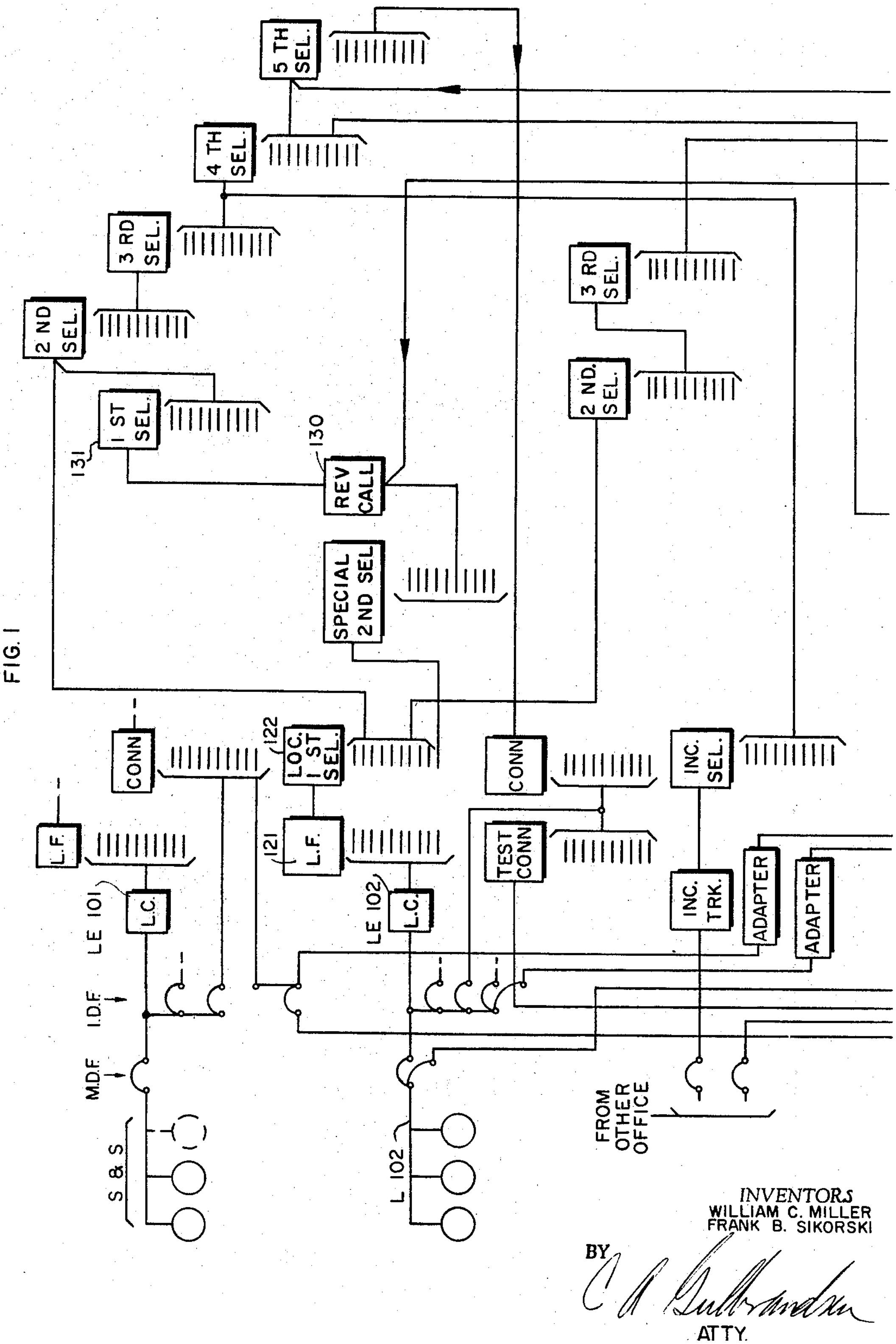
FIGS. 1 and 2 are to be arranged.
Figure 2:
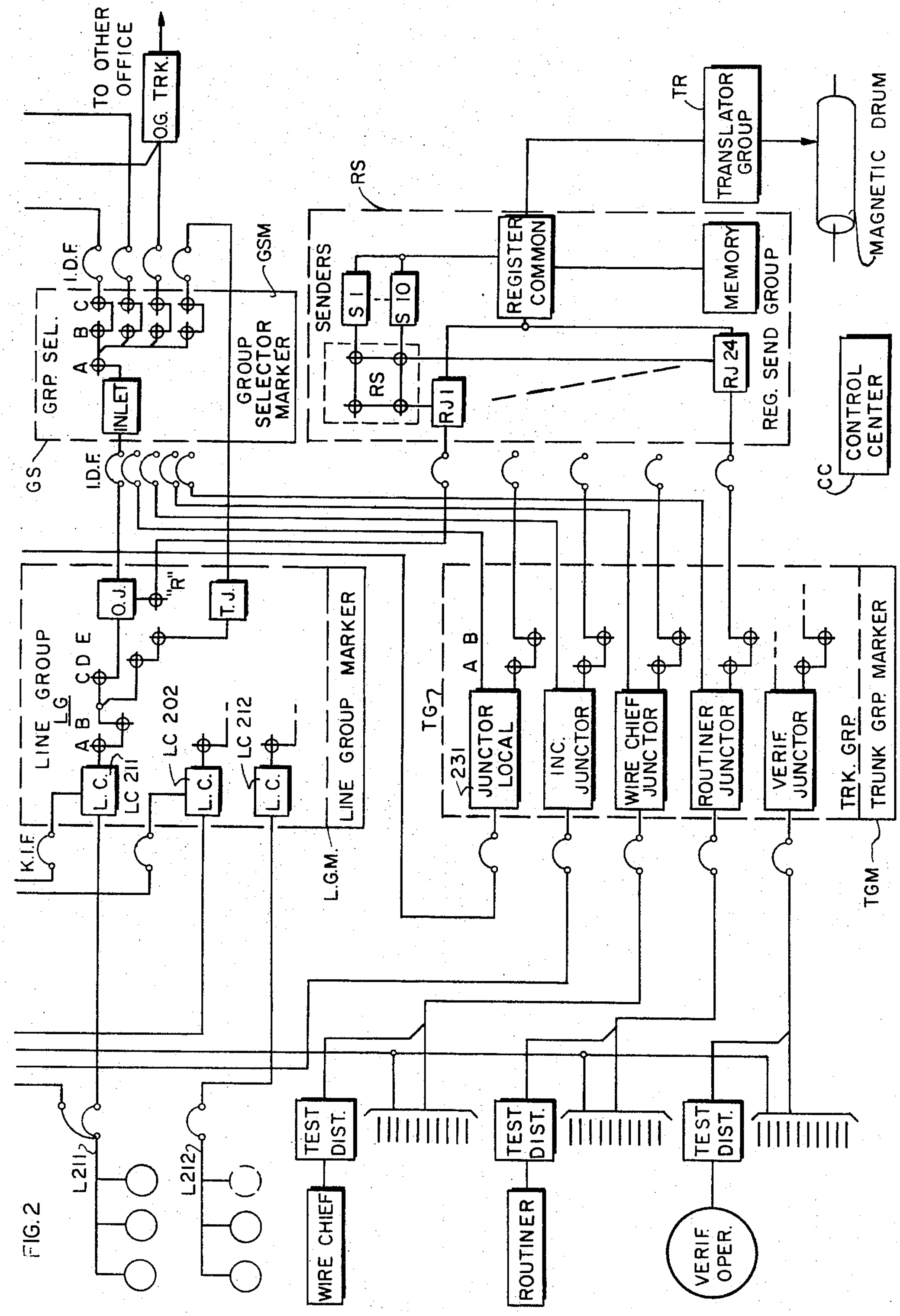

FIGS. 1 and 2 when arranged together comprise a single line block diagram of part of a telephone switching exchange, comprising a direct-controlled switching unit in FIG. 1 and a common control switching unit in FIG. 2.

*Step-by-step switching unit*

The direct dial controlled step-by-step switching unit shown in FIG. 1 may by way of example be of the type described in the following technical bulletins published by Automatic Electric Co., which are incorporated and made a part hereof, as though fully set forth herein.

800 Electrical principles of telephony
801 Mechanical principles of telephony
802 Fundamentals of apparatus and trunking
803 Distributing frames
805 The plunger lineswitch and associated master-switch
806 Rotary lineswitch
807 The connector
808 The selector
810 Pulse repeaters
812 Power and supervisory equipment
813 Party-line connectors and trunk-hunting connectors
814 Reverting-call methods
815 The test and vertification switch train
816 Toll switch train
817 Switching selector-repeater
818 Private automatic exchanges with PABX appdenix
820 Manual switchboards
821 Linefinder switches
945–804 Ringing schemes Editions and reprintings of the above bulletins as of April 1962 and later have the prefix 945– before the number listed above, designating a bulletin in the training series. The bulletins containing such six digit identification numbers are also made a part hereof.

The typical switching unit as shown in FIG. 1 comprises linefinders, selectors and connectors which comprise two-motion stepping switches and associated relay control circuits. In many cases plunger or rotary line switches are used instead of the linefinders. There are also known direct control systems using switches other than those of the two-motion type.

The direct control step-by-step subscriber lines are connected via a main distributing frame and an intermediate distributing frame to the line circuits which are connected to the banks of the linefinder switches. The connectors have their bank contacts connected to the intermediate distributing frame for grouping to form party lines.

The switching unit is shown equipped for a seven digit numbering plan. The operation briefly is initiated by one of the subscribers lifting his handset which operates a line relay in the line circuit and causes the linefinder to hunt and connect to the line circuit of the calling line. The calling line is now connected to a linefinder-selector link and receives dial tone. Operation of the dial at the subscriber station transmits loop interruption pulses which cause the first selector to step vertically to the level corresponding to the first digit, and during the interdigital pause the selector then automatically steps in the rotary direction until an idle trunk is found and the connection is extended to a second selector. The succeeding selectors in like manner operate on succeeding digits. On the next to last digit the connector steps vertical, and on the last digit it steps in the rotary direction, to the bank contacts of the terminal of the called line. The connector makes a busy test and if the line is idle it switches through and causes ringing current to be applied to the called line. The connector then provides answer supervision, provides battery feed to the calling and called lines during the connection, and provides disconnect supervision to release the connection at the end of the call.

Incoming trunk calls from other offices are handled in a similar manner, except that there is no linefinder, an incoming selector being connected directly to the incoming trunks. Outgoing calls are also handled in a manner similar to local calls, except that after an appropriate one of the digits the connection is completed to an outgoing trunk circuit and thence to another office which completes the connection in response to the succeeding dialed digits.

In small offices some of the selector stages may be omitted and the corresponding digits absorbed by special digit absorbing selectors.

*Common control crosspoint switching unit*

Referring to FIG. 2, the common control switching unit comprises two main parts, the transmission path and the common control. The transmission path comprises line groups such as line group LG controlled by line group markers such as marker LGM, and group selectors such as selector GS controlled by group selector markers such as marker GSM. There is also a trunk group TG which provides access from incoming trunks and various special service trunks to the registers. The line group LG, the group selector GS, and the trunk group TG each comprises an arrangement of crosspoint switching matrices. The crosspoints are made up of reed capsules having two windings—an operate winding and a hold winding. The markers employ electronic circuits which provide very high speed operation, and thus make possible the very short holding time in using the markers on a one-at-a-time basis.

The common control comprises register-sender groups such as group RS, and translator groups such as group TR. There is also a control center CC which contains a special computer for operation analysis and recording, and program upgrading equipment. Time division techniques are used in the register-sender group RS and in the translator TR. A ferrite core memory is used in the register-sender group for temporary storage, and a magnetic drum is used in the translator for semipermanent storage.

All of the electronic equipment is furnished in duplicate, for instance, two line group markers LGM may serve up to ten line groups and two group selector markers GSM may serve up to ten group selectors. A minimum of two register-sender groups will be equipped per office and the translator, including the magnetic drum and logic circuitry will always be furnished in pairs per 10,000 directory numbers.

*Ease of expansion*

Since the common control crosspoint switching unit will be applied most extensively in expanding existing step-by-step offices, considerable thought has been given to implement such an addition with a minimum of cost and change to the existing facilities. This is one of the reasons why the system is grouped into four functional sections. Each of the system sections are self-contained with regards to its logic circuitry and operates in an asynchronized manner with regard to the other system sections, thus making it possible to add each of the other mentioned system sections to an existing step-by-step office and be completely tested before put into service.

The philosophy of the system goes beyond merely line additions. It is intended to upgrade the existing step-by-step office by providing considerable recording and translation capabilities to meet with future requirements.

Of great importance to the operating companies is the possibility of offering the features available to the common control unit subscribers also to the subscribers located in the step-by-step part of the office. This is made possible due to the space division technique and the system compatibility with electromechanical switching requirements. As to the degree of compatibility, in an integrated office such as the one described above, it may be mentioned that a subscriber may move back and forth between the step-by-step and the common control unit without changing the directory number.

*Operation of crosspoint unit for a local call*

A brief description of a typical local call as processed through the common control crosspoint switching unit is now presented.

When a subscriber lifts the handset, the line group marker LG goes into action first by detecting the originating call mark, identifying the calling line, and selecting an idle register junctor within the register-sender. A path is then temporarily established from the calling telephone to the register junctor such as RJ1 via the A, B, C matrices, an originating junctor OJ and the R matrix, and the subscriber receives dial tone. The dialed digits are stored temporarily in the memory, coded and processing is continued as these digits are passed to the translator TR, analyzed for type of incoming call, and instructions are selected from the drum memory and returned to the register sender to guide further handling of the call. Upon receipt of the remaining digits, the translator TR returns switching instructions corresponding to the called number as stored in the drum memory. The instructions are transmitted from the register-sender RS via one of the senders such as S1 and the originating junctor of the originating line group to the group selector GS. In the group selector GS, the instructions are analyzed by the marker GSM, an idle terminating junctor in the terminating line group is located, and a path established to that line group via A, B and C matrices of the group selector. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing, then release to serve other calls. The register-sender RS and the translator TR are functioning on a time division basis and therefore are processing several calls simultaneously. The temporary signaling and control paths are released for further service, while only the talking paths are held through the switching matrices and junctors.

*Interworking calls*

Assume that a subscriber on a step-by-step line in FIG. 1 initiates a call to a crosspoint line FIG. 2. The call proceeds by seizure of a finder-selector link, and setting up a connection via selectors on response to dialed digits until sufficient digits have been dialed to determine that the call is to be terminated in the crosspoint switching unit, this being four digits as shown in FIG. 1. The fourth selector being stepped to theis level, selects a trunk to a junctor in the crosspoint trunk group, such as junctor 231. The trunk from the fourth selector to the junctor 231 comprises three conductors, and ground is placed on the control conductor in the junctor upon seizure to mark it busy. During the interdigital pause the trunk group marker TGM recognizes the call and causes a connection to be completed from the junctor 231 via the A and B stages in the trunk group TG to a register junctor in the register-sender group RS.

The trunk group marker also supplies class of service and trunk number identity to the register-sender group. The remaining three digits dialed by the stey-by-step subscriber are then recorded in the register-sender memory. The translator TR is seized and the class of service information along with the three dialed digits are supplied thereto. As explained in the copending U.S. application Ser. No. 309,093 filed Sept. 16, 1963 by E. P. Kostogiannis et al. for a Magnetic Drum Translator, now Patent No. 3,284,574, the translator makes use of the class of service information along with the dialed digits to recognize the directory number of the called subscriber and accordingly derive the equipment location number from the drum and return it to the register. The register supplies the instructions and equipment location number to the sender which then proceeds to cause a connection to be completed via the crosspoint group selector and line group to the called line and the appropriate station signal.

Assume now that a subscriber on a crosspoint line in FIG. 2 initiates a call to a step-by-step subscriber line in FIG. 1. The line group marker causes a connection to be established through the line group A, B, C stages, an originating junctor and an R stage to a register junctor in the register-sender group, and the seven digits dialed by the subscriber are received and recorded in the register sender memory. The translator returns routing information designating a crosspoint group selector outlet level to the local step-by-step equipment along with instructions to then outpulse the last three dialed digits. As shown in FIGS. 1 and 2 trunks from this group selector output level are connected directly to fifth selectors in parallel with outlets from step-by-step fourth selector levels. Thus in accordance with the translator instructions the sender causes the connection to be established through the group selector for this level, and the last three dialed digits are dial pulsed to step the fifth selector and the connector to the designated line terminal.

In another arrangement not shown in FIGS. 1 and 2 the crosspoint group selector outlets from the level to the local step-by-step unit may be directly connected through individual first selectors, in which cause the instructions from the translator would designate that all seven of the dialed digits are to be dial pulsed.

*Revertive calls*

There are many possible arrangements for handling revertive calls in the exchange. Some of the possible arrangements for the common control crosspoint equipment are described in the copending U.S. patent application Ser. No. 308,112 filed Sept. 11, 1963, by D. K. K. Lee et al. for a Register-Sender Arrangement for a Communication Switching System Common Control Arrangement. There are also many known arrangements for step-by-step equipment. These known arrangements may have the calling subscriber dial a called subscriber's directory number, or a special code, or an access code followed by the directory number. In any of the common arrangements the calling subscriber must hang up after the completion of dialing so that the called party may be signaled.

For example in an arrangement using a special code the initial digits are used to access a special revertive call switch, after which two additional digits are dialed and registered in the revertive call switch, one digit designating the calling party and the other digit designating the called party. Then the calling party hangs up and the two digits registered in the switch cause ringing signals to be supplied for these two stations. In step-by-step equipment this revertive call switch is accessed from a selector level, and in the common control equipment it would be accessed from one of the selector outlets. It is readily apparent that this type of revertive call switch can be used on lines having both step-by-step and common control station terminals, since the control of the connection is over the originating path to the reverting call switch, and the same type of ringing signals are used with both types of equipment.

Another example for handling reverting calls is shown in FIGS. 1 and 2. The step-by-step equipment is provided with revertive call switches 130 of the type disclosed in U.S. Patent 3,033,931, issued May 8, 1962, to L. L. Smith for Reverting Call Telephone System. In a typical call between two stations on a step-by-step line, the initiation of the call causes a line finder and first selector to be seized. The access code which may for example be 155 is then dialed. The first digit "1" steps the first selector to the first level to seize a special second selector. The second selector may be digit absorbing so that one digit "5" is absorbed and the other digit "5" steps the switch to seize the revertive call switch 130. The seven digits of the called party's directory number are dialed, and the first six of these digits are repeated to operate the switch train in the usual manner. The last digit is stored on a minor switch in the reverting call switch. The calling subscriber receives busy tone as an indication to go on hook. By hanging up the calling subscriber clears the line so that the connector can make the usual busy test. The reverting call switch sensing the on hook condition commences to outpulse the seventh digit into the connector. When the connector has been pulsed to the desired terminal and senses an idle condition, it will ring the called party's telephone. The called party upon answering the call operates the back bridge relay in the connector. This answer condition sends reverse battery supervision back to a differentially wound relay (not shown) in the reverting call switch. Since the differentially wound relay was operated initially on seizure, it will release when it senses the reversal of battery potential. The releasing relay will release another relay to supply tick tone on the line as an indication to the called subscriber that this is a reverting call. The calling subscriber will go off hook and the two subscribers can now converse. The back bridge relay in the connector will supply the transmission battery and since the connectors are provided for last party release the connector is guarded from seizure by another party. When the two parties are through conversing and go on hook they will release the connector and all circuits will return to normal. Note that the connector is the only part of the switch train that is held during conversation, because at the time the differentially wound relay in the revertive call switch released in response to the reverse battery answer condition, everything in the switch train releases, except for the connector which the calling and called subscribers are holding.

These same revertive call switches may be also used for revertive calls on common control lines. The common control subscriber in initiating a revertive call seizes an originating path to the register in the usual manner and proceeds to dial the access code followed by the seven digits of the called subscriber's directory number. The register sender unit upon receiving the access code 155 seizes the translator which returns the routing digits for a group selector outlet to an idle revertive call switch. The revertive call switch can be seized from a common control group selector outlet testing for idle switches in parallel with outlets from the special second selector as shown, or a first selector could be provided from the common control group selector outlet to access the special second selector and thence the revertive call switch. In addition to the routing instructions for a path to the revertive call switch, the translator instructs the sender to outpulse all of the subscriber dialed digits of the directory number of the called subscriber. The sender starts outpulsing immediately. The first four digits of the directory number operate the first four selectors of the step-by-step equipment. A junctor in the trunk group of the common control equipment is seized and a path established to another register. The subsequent digits are then supplied to the common control register and stored. After the calling subscriber finishes dialing and hangs up the seventh digit from the revertive call switch is pulsed into the register, a translator is seized and the routing information returned and the sender completes a path through the common control equipment to the terminal of the called line. Then after the call is answered all of the step-by-step and common control switch train is released except the terminating junctor and the terminating path through the line group to the line. Transmission battery is supplied from the terminating junctor and when both parties hang up the terminating junctor and path to the called line are released.

In an interworking call between a common control party and a step-by-step party on the same line the operation will be the same as corresponding portion of the call in the two calls as described above. For example if the line is a step-by-step line the origination of a call from any station on the line will seize a line finder and first selector and in response to the access code 155 the reverting call switch will be seized. If the line is a common control line initiation of a call will cause a path to be established through the line group to a register, and dialing of the access code 155 will cause a path to be extended through the group selector to the revertive call switch. If the call is being completed to a called station having a step-by-step connector terminal the connection will be established from the revertive call trunk to the connector in the same manner as for a step-by-step call as described above. If the called subscriber has a common control terminal the connection will be completed through the four step-by-step selectors and thence through the common control equipment as for the common control call described above.

*Special calls*

Arrangements for accessing subscriber terminals by wire chief or operator busy verification differ between the step-by-step and common control equipment. The step-by-step equipment uses a separate test switch train from a test distributor. Each shelf of connectors is provided with one test connector to which all of the test distributors have access. There is usually one test distributor prvided for wire chief calls and another for operator busy verification. There may also be a separtae test distributor for a routiner for such as testing line insulation.

The common control equipment on the other hand is designed to provide access via the same switching network through the group selector and the line group as is used for normal traffic, with access provided via special junctors in the incoming trunk group, as described in the copending patent applicatin for Automatic Central-Office Equipment Testing Arrangement by J. R. Vande Wege, Serial No. 361,127 filed Apr. 20, 1964. The translator recognizes the class of service of the special junctor and provides a special digit in place of the party digit in the translator switching digits. This is recognized in the terminating junctor to provide the proper metallic path and other requirements. The lead WC from the cutoff relay in the line circuit is taken via a relay tree in the marker to control the cutoff relay and permit connection to a busy line.

Separate points of access to common control in step-by-step test or verification trunks could be provided at the test and operators' positions. A uniform point of access would, however, be more desirable. This may be accomplished as shown in FIG. 2 by routing all wire chief calls via one test distributor and busy verification calls via another test distributor. As shown there could also be a separate test distributor for routiner operation. All common control lines appear on specific levels of the test distributor. These levels are arranged to hunt automatic rotary for the junctors into the common control equipment. By use of class-of-service identity and the three remaining dialed digits, the common control translator will recognize the call as being special and will have sufficient information to reach the called line.

On mixed party lines with both step-by-step and common control directory number subscribers, as a result of subscribers moving from one party line to another, wire chief and busy verification access is possible via either unit.

LINE FRAME AND TERMINATING SWITCH DETAILS

*Step-by-step terminal-per-station service*

To make it possible for party line subscribers to move without change of directory number, step-by-step exchanges are provided with terminal-per-station service. Each station is served by an individual connector terminal from the bank contacts of a shelf of connectors. The connectors are of the two digit type, for vertical and rotary stepping as distinguished from the three digit connectors used in terminal-per-line service in which one of the digits steps a minor switch to determine the ringing potential to be applied to the line. Terminal-per-station exchanges are of two specific types, frequency-per-shelf and frequency-per-terminal, differing in the manner the ringing potential is routed to the connector bank terminals.

A terminal-per-station, frequency-per-shelf exchange employs basic two digit local connectors equipped with three sets of bank contacts, T, R, and C. These connectors are grouped in shelves, and each shelf is fed ringing potential of particular frequency, polraity, code. Accordingly with bridged ringing each station on a party line is represented on the bank terminals of a different shelf. A particular station on a party line is then selected by accessing the line from a shelf with the appropriate ringing potential.

The bank terminals of all stations sharing a party line are connected in common to the line by means of party line bunching blocks on the LIDF (line intermediate distributing frame). These bunching blocks additionally serve, in the case of divided ringing, to route ringing potential to the appropriate line wire (T or R).

The frequency-per-shelf method of party selection imposes a limitation in the formation of party lines. The limitation is; any terminal number is inherently rung with only one set frequency, if the customer moves to another part of town, and the only cable pair passing his house and not already filled, has on it already a party rung with the frequency the just-moved customer had at his old location, then the just-moved customer cannot keep his old telephone number, but must accept a new (changed) number.

The frequency-per-terminal and frequency-per-shelf types of terminal-per-station exchanges have in common the provision of a separate connector bank termination for each subscriber station available for calling. The difference between the types is basically one of flexibility in the assignment of ringing potentials to called stations on a party line. In a three-wire, frequency-per-shelf office, each shelf of connectors receives a separate ringing potential of a particular frequency, polarity, code, or combination, and the type of potential a station receives is dependent upon the shelf location of connectors assigned to it. Thus a direct correlation exists in the frequency-per-shelf system between a customer's number and the potential assigned him. The frequency-per-terminal system employs connectors which can individually supply any one of the various party line ringing potentials to the stations on their banks, and thereby eliminates the shelf arrangements and directory number limitatitons necessary in the frequency-per-shelf system.

The frequency-per-terminal system is disclosed in U.S. Patent No. 1,727,133 to R. G. Richardson et al. for a Party Line Automatic Telephone System. This type of exchange requires four connector-bank terminations for each subscriber station. Three terminals (T, R, and C) serve the same functions as they do in the two-digit connectors of the three-wire plan; the fourth terminal, designated the EC bank contact, determines which of several discriminatory ringing potentials available to the connector is placed on the line. Depending upon which ringing scheme is used in the exchange, all frequencies, polarities, or codes of ringing potential are supplied in sequence to each connector over a single lead from the ringing generators. The EC contact of a particular station receives ground pulses from a ringing interrupter relay during the interval in which the desired ringing potential is applied to the generator lead. These pulses are used to operate a ringing control relay in the connector, which gates only one of the several possible potentials to the called station.

The exact manner in which the EC contacts and generator lead are used is different for each type of discriminatory ringing potential.

For multifrequency ringing, each of the five frequencies is placed in sequence on the generator lead for a period of 1.2 seconds. The resultant 6-second interval is repeated cyclically, so that for any frequency, there appear 1.2-second pulses separated by 4.8 seconds—the standard ringing cycle. The EC bank contact of a particular station receives a continuous 1.2-second pulse during the time slot corresponding to that of the station's frequency on the generator lead.

With superimposed ringing, the two polarities of ringing are placed alternately on the generator lead, each for a period of 2 seconds. The EC contact of a particular station receives a 2-second ground pulse simultaneous with the application of the station's ringing polarity on the generator lead.

With coded ringing, one frequency stays always on the generator lead. A ground appears on the EC contact during each ring of the called station's code to operate a relay and extend the code to the line.

There are also combinations of code and multifrequency ringing which can be controlled by ground pulses on the EC contact in a similar manner to the above schemes.

All stations sharing a party line (these may or may not be located or connected to the same shelf) have their common connection to the line by means of party line bunching blocks on the line intermediate distributing frame employed by the exchange. When divided ringing is employed on a line, the division of ringing current to the T and R sides of the line is governed by the strapping of jumper leads on the bunching blocks to the individual stations.

Individual lines can also be served by the four-wire connectors and, in fact, by the same connectors which serve party lines. For this purpose, individual line stations have their EC bank contacts marked so as to select one-ring ringing potential of straight-line frequency.

The frequency-per-terminal, terminal-per-station plan offers the previously mentioned feature of complete flexibility in the assignment of directory number. Furthermore, both types of terminal-per-station exchanges have important advantages in number changing and intercepting practices as compared to terminal-per-line operation. Practically all number changing of party line stations is eliminated on line regrouping, or upgrading, and in subscriber moves within the exchange area. This permits more efficient utilization of outside plant facilities, equalization of originating traffic loads on the subscriber lines, and greater ease in changing class of service.

Also on intercepting, when a call is made to a vacant or changed number, or a line out of order, an operator or recorder announcer must be provided to intercept the call and inform the calling party of the status of his call. With a terminal-per-station exchange, it is simple to place a station on intercept, merely jumper the station's bank terminals to an operator or a recorder announcer. In a terminal-per-line exchange, where one set of bank terminals represents all stations on a party line, the equipment for intercepting calls to a particular station is much more involved.

Note that in the common-control crosspoint switching unit, all of the above advantages are available even though there is only one terminal per line, because number translation is provided on every call, and the instructions in the translator storage are easily changed.

Figure 3:
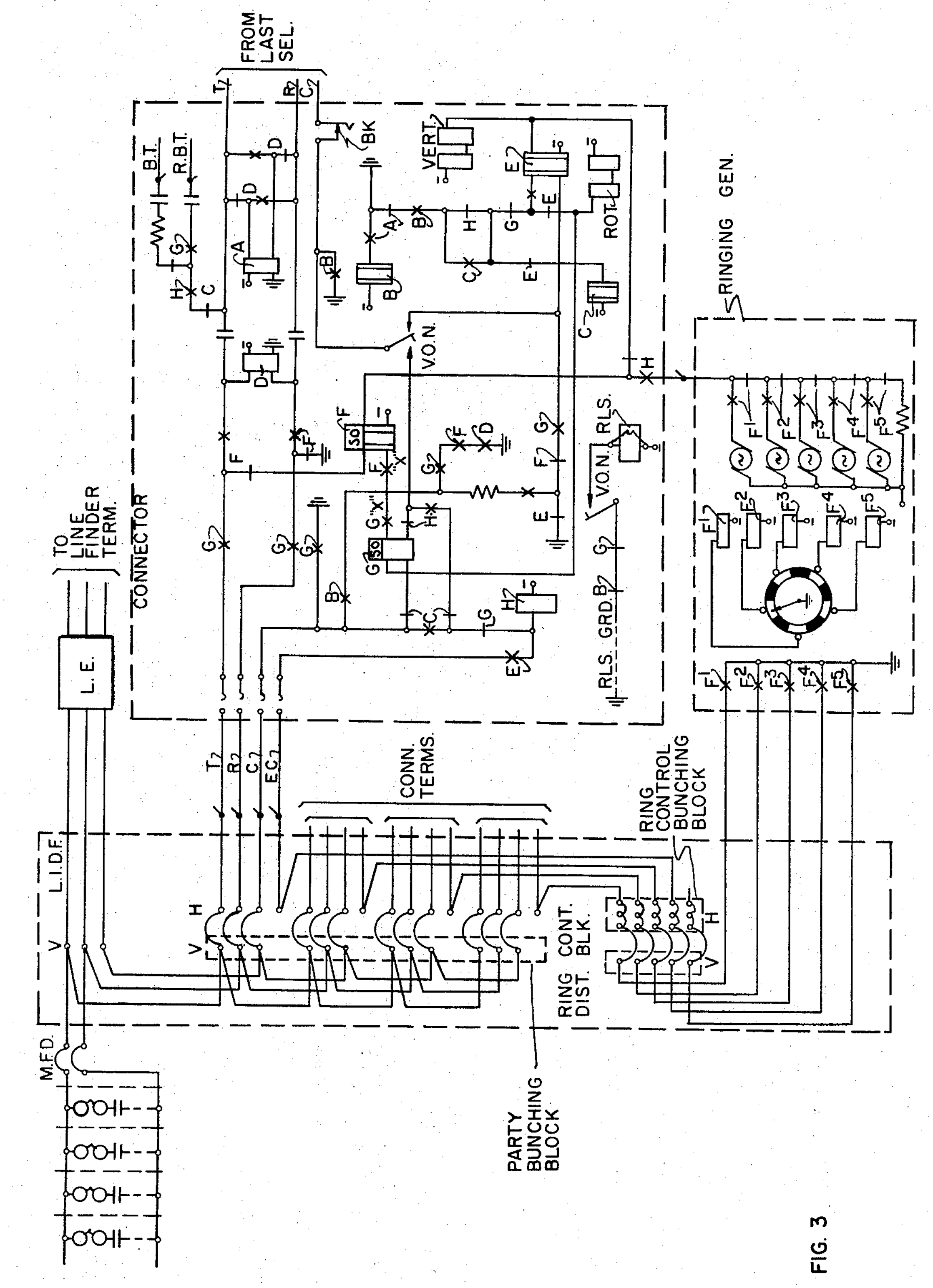

FIG. 3 shows a connector, distributing frame, and party line arrangement for terminal-per-station, frequency-per-terminal service. Multifrequency divided ringing is shown. Four stations are shown bridged on a party line. The main distributing frame MDF is the junction point between the inside switching equipment and the outside cable plant, the outside line being connected to one side of the frame, and a tie cable to the line intermediate frame being connected to the other side with a jumper between the two sides of the frame to associate the outside line with particular inside switching equipment.

The line intermediate distributing frame LIDF provides frame termination for the line relay circuits and connector bank contacts, mounting space for party line bunching blocks, intercepting bunching blocks, ring control distribution and bunching blocks, and the frame terminations for the tie cables to the main distributing frame.

The line relay circuits LE are wired to the vertical of the line intermediate distributing frame and connector bank contacts to the horizontal line intermediate distributing frame. Since connector bank contacts exceed line relay circuits there is sufficient mounting space remaining on the vertical side for the intercepting and party line bunching blocks. In the four-wire arrangement as shown ring control distributing blocks are vertically mounted and ring control bunching blocks horizontally mounted between adjacent 100 line groups of connector bank terminals. To form a multiparty line the party bunching block on the vertical of the intermediate frame, the assigned line relay LE is accommodated on row 1 of the bunching circuit, and connector bank terminals on succeeding rows on the basis of one row per party line station this bunching block accommodates the three line wires T, R and C. The connector terminals on the horizontal side of the intermediate frame are connected via three wire jumpers to particular rows on the bunching block on the vertical side of the frame. To provide for the connection to the fourth wire of the connector bank circuit for ringing control the intermediate distributing frame is arranged as follows. Ground pulses from the ringing interrupters are terminated on a specially strapped ring control distributing block mounted on the vertical intermediate frame. They are jumpered by connector ringing groups to specially strapped ring control bunching blocks on the horizontal side. Groups of strapped contacts, each group representing ground pulses for a specific ringing potential, and so identified, are now located adjacent to the connector bank contacts with which they associated. Thus a short jumper from connector bank block to ring control bunching block selects ringing codes for subscriber's station equipment.

The connector with a four-wire bank termination comprises a pulsing relay A, a holding relay B, a vertical sequence relay E, a rotary sequence relay C, a busy test and ringing control relay H, a wiper closing relay G, a ring cutoff relay F, and a back bridge relay D.

Battery potential through the lower winding of relay E marks this circuit idle to a battery switching selector. When a selector seizes this connector, relay A is closed over leads T and R. Relay A operates and closes a circuit for relay B. Relay B operates, grounds lead C to mark the connector busy to other selectors and holds preceding equipment operated and prepares a circuit to the upper winding of relay E. Relay E operates over its lower winding via the vertical off normal contacts, and completes a path via its upper winding to the pulsing contacts of relay A.

Relay A follows the first series of dial pulses, and when at normal opens relay B and closes the circuit to the vertical magneti in series with the upper winding of relay E, thus stepping this switch to the desired level. As the switch steps to the first level, the vertical off normal springs restore and open the operating circuit of the lower winding of relay E. Relays E and B do not restore during vertical stepping due to their slow release characteristics. At the end of a last pulse of this first digit, relay A reoperates, closes relay B, and opens the circuit of relay E. Relay E releases and closes the pulsing circuit to relay C and the rotary magnet in multiple.

Relay A follows the second series of pulses, and, when at normal, opens the circuit of relay B, and closes the circuit of the rotary magnet in multiple with relay C. The magnet follows the pulses, rotating the wipers to the dialed terminals. Relay C operates on the first pulse and connects negative battery potential through the busy test relay H to the C wiper. At the end of pulsing relay A reoperates, closes relay B and opens relay C. Relays C and B are slow to release and remain operated during rotary stepping.

If the dialed line is busy, ground is encountered by the C wiper which energizes relay H. Relay H operates and connects busy tone to the calling line. When relay C releases, relay H locks and remains operated until the calling party disconnects.

If the dialed line is idle, resistance battery is encountered by the C wiper. When relay C releases a path is completed via break contacts (part of a break-make-before-break set) of relay C, the lower winding of relay G, break contacts of relay H, vertical off normal springs, to the holding ground via make contacts of relay B. Relay G operates its X contacts, which for just a moment connect relay G upper winding in parallel with the cutoff relay in the line equipment and in series with relay G lower winding. The circuit is from battery through the rotary magnet, upper winding of relay G and the X contacts thereof, make contacts of relay B, break contacts of relay E, lower winding of relay G, break contacts of relay H, and vertical off normal and make contacts of relay B to ground. The high resistance of the upper winding of relay G allows only a small current flow so that the rotary magnet does not operate. Relay G operates fully, and its make contact connect solid ground to the C wiper for the cutoff relay in the line equipment, and the upper winding of relay G. The lower winding of relay G is short circuited.

A ground signal via break contacts of relay E, break contacts of relay F, and make contacts of relay G operates relay E via its lower winding, which locks through its make contacts and a resistor to ground via contacts of relays B and G, and closes wiper lead EC to the winding of relay H. The operation of relay H in following the ground pulses from the ringing interrupter via wiper EC places ringing current on the called line via the upper winding of relay F. This ringing current is the proper frequency for signalling the called line, since the interrupter relay which places the ground potential on the EC wiper also closes a make contact to connect the appropriate generator frequency to the common conductor from the ringing generator equipment to the connector. The ringing process is repeated during each cycle of the interrupter until the called party answers. Ring back tone is sent to the calling party during ringing through a capacitor and contacts of relays G, H, and C.

When the called party answers, the circuit of the upper winding of relay F is completed through the called telephone. Relay F operates its X contacts, locks and operates completely, opens the connection to the lower winding of relay E, causing relay E to release and open the circuits to relay H. Relay H restores to prevent further ringing. Relay D operates via the line to the called telephone and reverses battery to the calling line for purposes of supervision and metering.

After both parties have released, a path is completed from the release ground connection via break contacts of relay B and G and vertical off normal contacts to operate the release magnet, which returns the switch shaft to normal and closes the vertical off normal springs. The circuit is now at normal.

*Common control line group*

Figure 4:
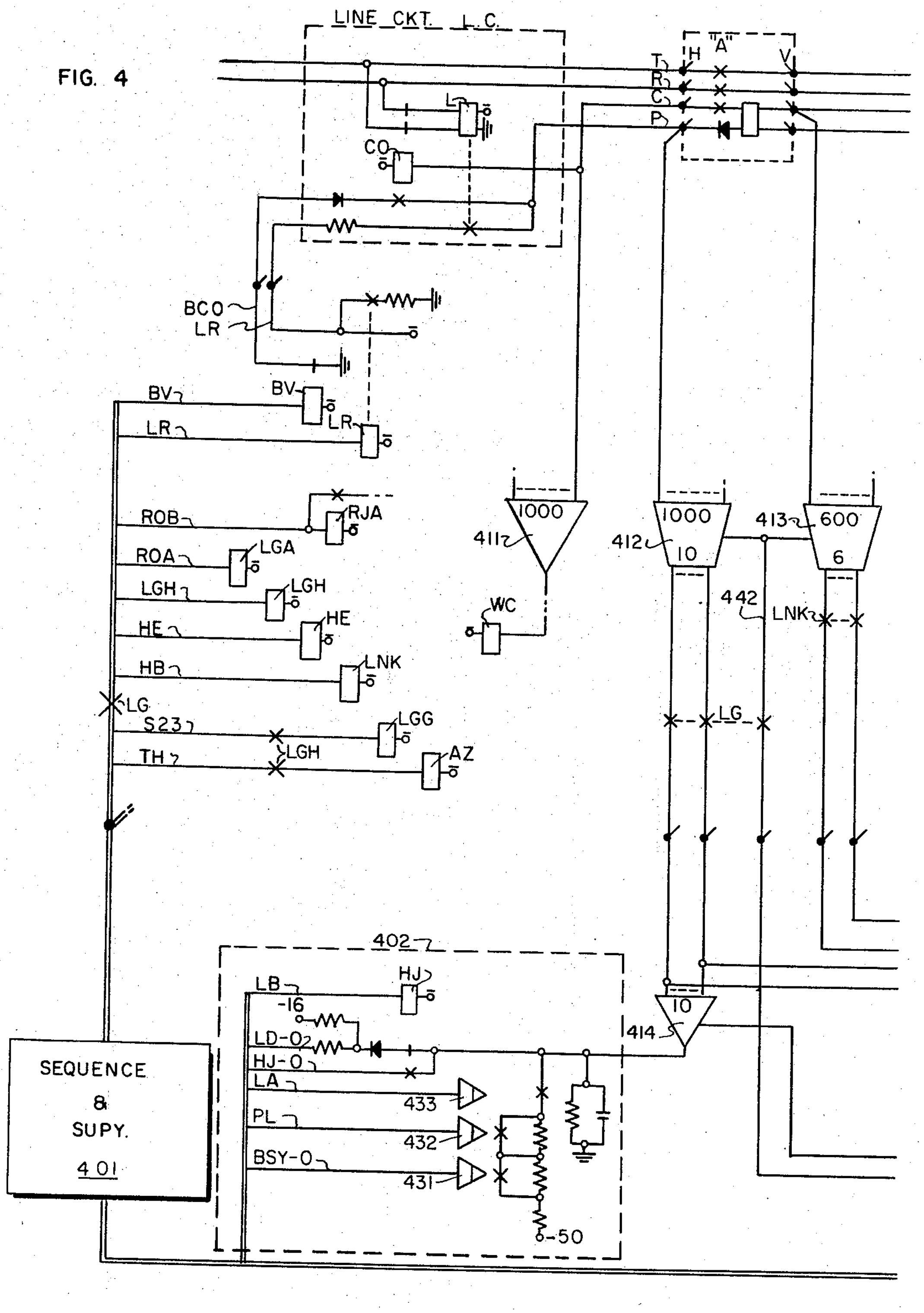
FIGS. 4–8 are to be arranged.
Figure 5:
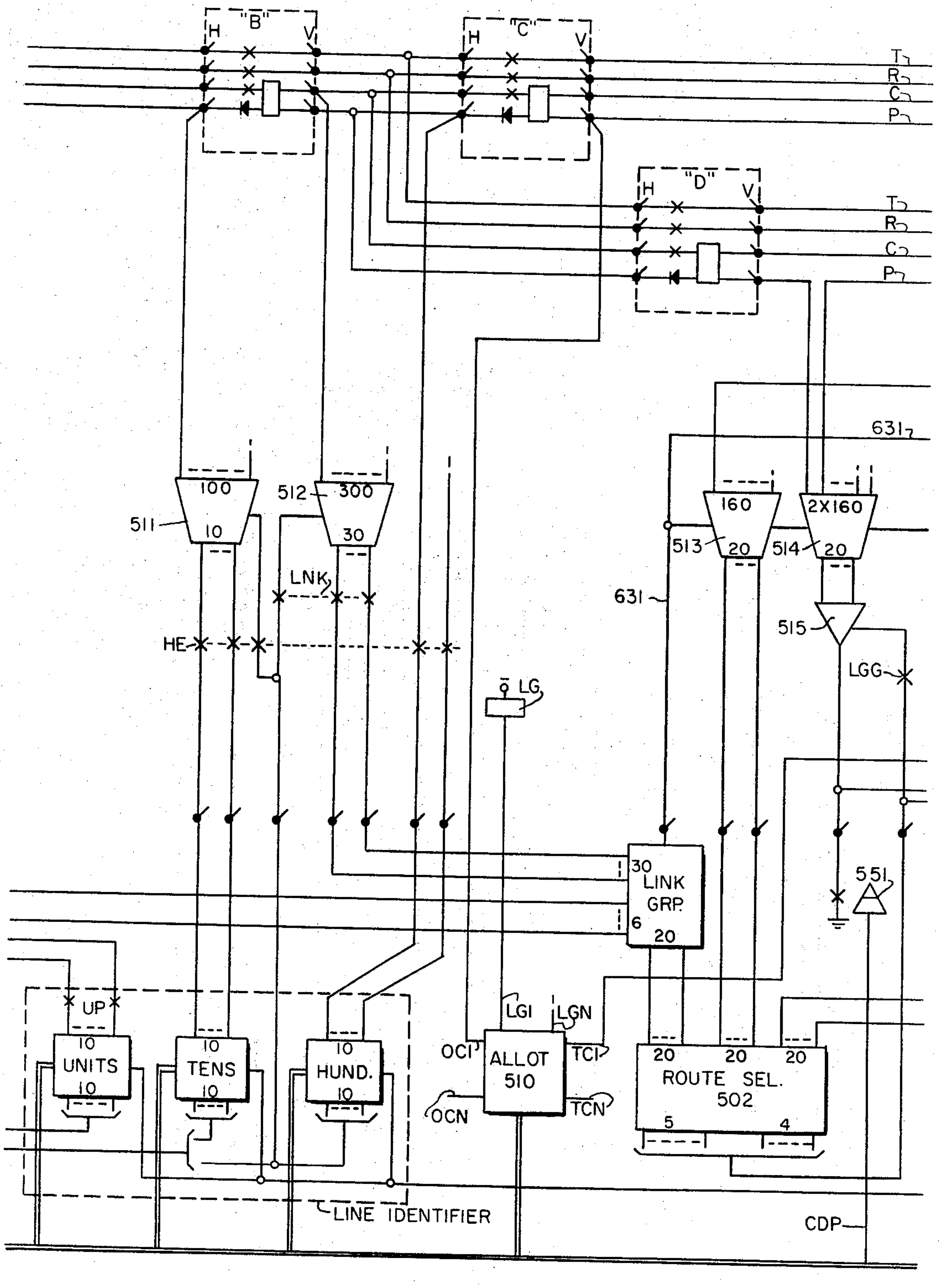
Figure 6:
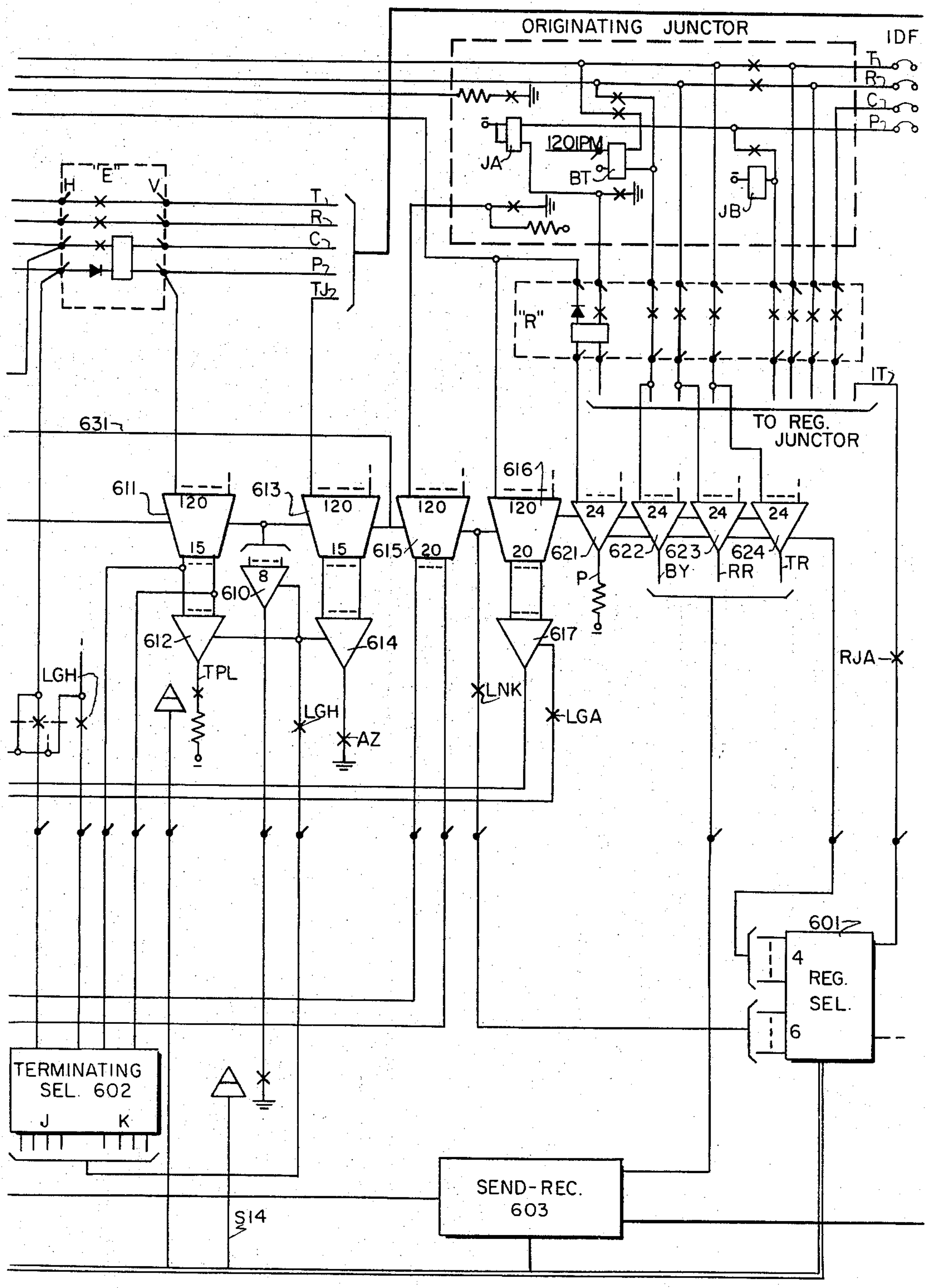
Figure 7:
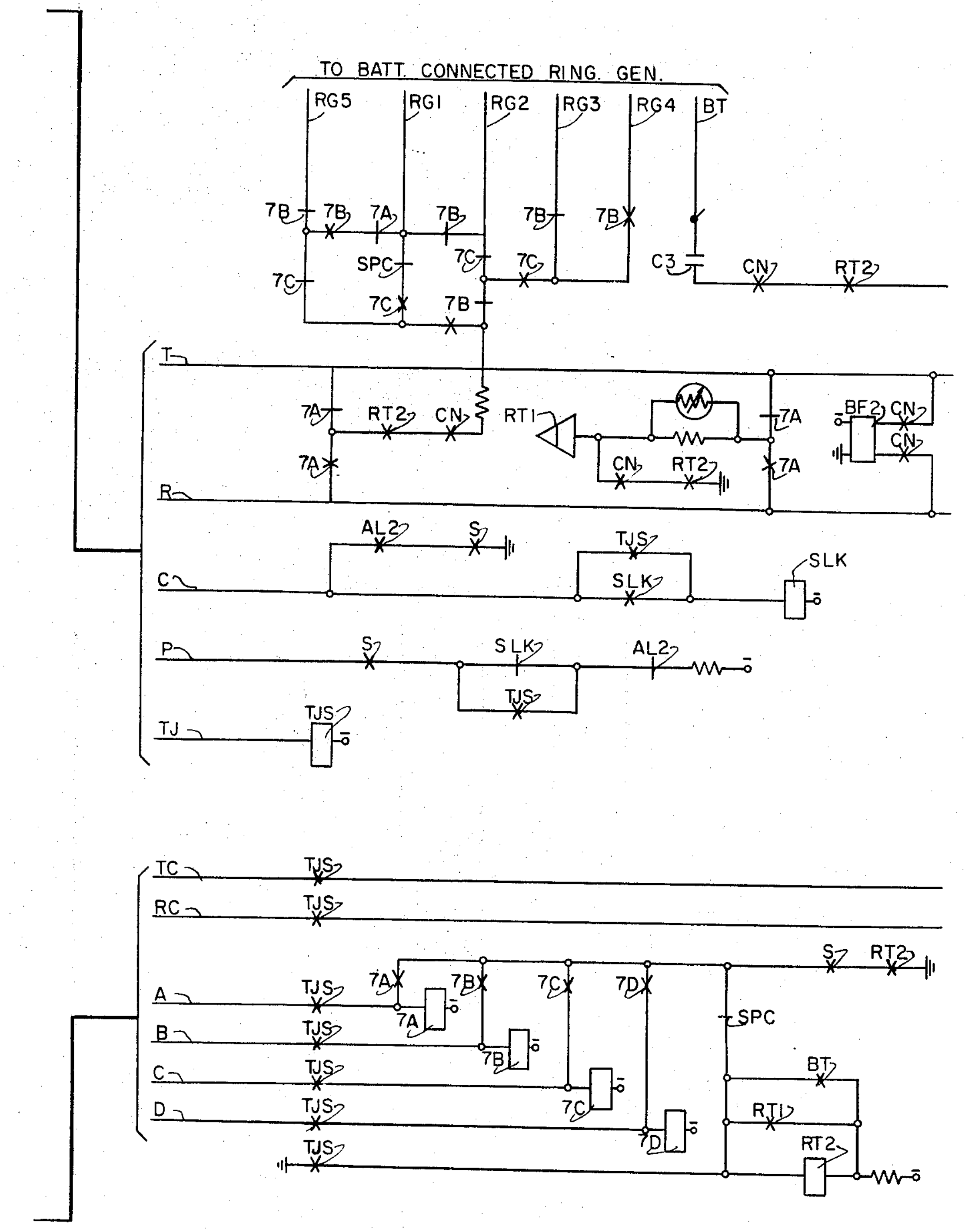
Figure 8:
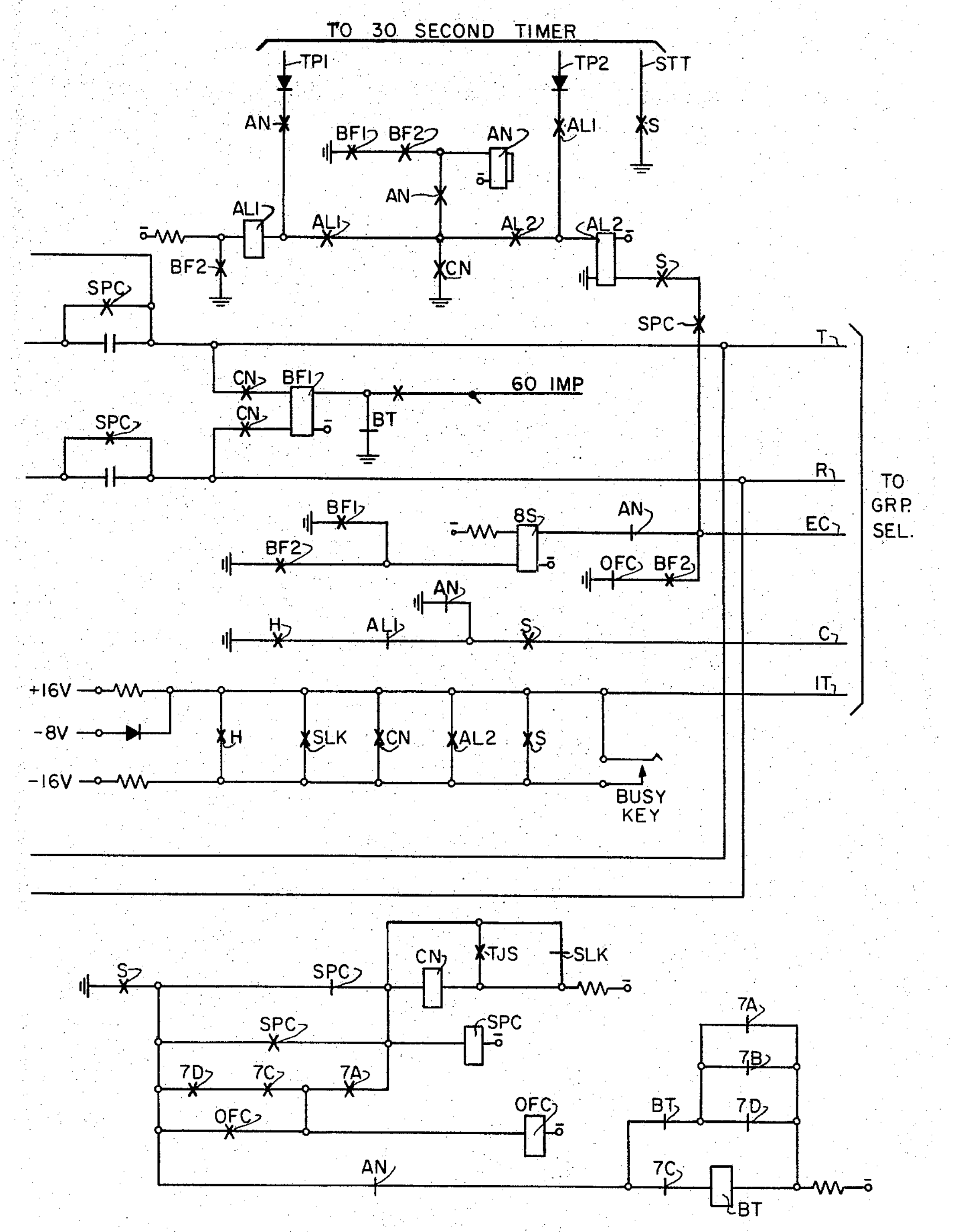

A common control line group and marker are shown in functional block and schematic diagram in FIGS. 4–8, with switching network and marker shown in FIGS. 4–6 and a terminating junctor in FIGS. 7 and 8. The arrangement of the switching network and the details of the marker are shown in several copending U.S. patent applications, one of which is Ser. No. 304,892, filed Aug. 27, 1963, for a Marker for a Communication Switching Network by W. R. Wedmore.

A typical originating and terminating transmission path showing one crosspoint of each stage appears across the top of FIGS. 4–6. There are 1,000 subscriber lines served by the group having individual line circuits LC. The A and B stages are divided into 100 line subgroups, each having 10 A matrices and 6 B matrices in a primary secondary spread. Each A matrix has 10 horizontal terminals individual to the line circuits, and 6 vertical terminals. Each B matrix has 10 horizontal terminals and 5 vertical terminals, so that there are 30 B stage vertical terminals for each 100-line subgroup. The C and D stages form a tertiary stage, with the C stage serving originating calls and the D stage serving terminating calls. There are a total of 30 C matrices and a corresponding 30 D matrices. Each C matrix and each D matrix has 10 horizontal terminals, each of which is connected to a B stage vertical terminal of a different hundreds subgroup. There are 120 originating junctors each having a connection to a C matrix vertical terminal, a connection to an R matrix horizontal terminal, and a connection to a selector inlet. There are a total of 6 R matrices each having 20 horizontal terminals to individual originating junctors, and 4 vertical terminals to register junctors. In the terminating path there are up to 8 E matrices each having 20 horizontal terminals to individual D matrix vertical terminals, and 15 vertical terminals to individual terminating junctors.

The line group marker connect circuits, which are individual to the line groups, are shown across the center of FIGS. 4–6. Relay trees are shown as trapezoids or triangles, with the number of leads on each side of the tree indicated therein, the apex of a triangle being a single lead. Some of the relays which control the sequence of operation are shown. A relay contact set shown on a line representing a plurality of conductors is used to indicate that there is an individual contact set for each conductor.

Marker apparatus common to a plurality of line groups, shown across the bottom of FIGS. 4–6, comprises electronic scanners and other control circuits. The sequence and supervisory unit 401 supplies sequence state signals and clock pulses for the marker. A line identifier 501 comprising a hundreds scanner, tens scanner, and a units scanner is used to identify the subscriber line terminal for both originating and terminating calls. A route selector 502 selects an idle path through the switching network for both originating and terminating calls. A register selector 601 selects an idle register on originating calls. A terminating selector 602 identifies and selects a terminating junctor requesting service for a terminating call. A send receive unit 603 transmits line number identification information to the register during an originating call, and communicates with the sender during a terminating call, using a high speed serial binary transmission arrangement.

The marker includes relay drivers designated by small triangles with a line across it parallel to the base and a make contact adjacent to the apex of the triangle, and represents a single transistor amplifier driving a relay winding which operates the single make contact.

The operation for an originating call is initiated when a subscriber closes his line loop and causes his line relay to operate. Negative potential via lead LR, a resistor in the line circuit, and the contacts of the line relay is applied to the P conductor of the line terminal. This potential extends via the pull windings and associated diodes of the A, B, and C stages and appears at the conductor OC1 from one of the vertical C terminals. The allotter 510 detects this potential as an originating call in line group 1 and applies a potential via lead LG1 to operate the relay LG in the corresponding line group. A signal is also supplied to the sequence circuit 401, to cause the signal HF to become true and via a contact of relay LG to cause relay HE in the corresponding line group 1 to operate. This connects the ten P leads from the horizontal terminals of one of the C matrices to the input of the hundreds scanner. The sequence circuits then supply a signal to start the hundreds scanner until it detects the calling potential and thereby identifies the hundreds group, applying a marking potential to the corresponding output lead of the scanner. Ten output leads from the hundreds scanner are taken through respective contacts of relay HE to the set of conductors 521 to control the relay tree 511, which connects the ten P leads from the horizontal terminals of one of the B matrices in the selected hundreds group through the relay tree 511 and contacts of relay HE to the tens scanner. The sequence circuits supply a signal to the tens scanner to start it and identify the tens group in which the calling line appears. Ten leads from the hundreds scanner outputs and ten from the tens scanner outputs are taken through contacts of relay LG and via conductor group 422 to control the relay trees 412 and 413. The ten P leads from the A matrix of the calling line are taken through relay 412 and contacts of relay LG, and thence through contacts of relay UP to the input of the units counter.

The marker is now ready to pre-select a register. Relay RJA has operated via lead ROB and contacts of relay LG from the sequence circuits 401. The 24 idle test leads IT from the register junctors are taken via contacts of relay RJA to the inputs of a register selector 601, which is started in response to a signal for the sequence circuits 401 to select one of the registers supplying a signal to one output lead in a group of six and another output lead in a group of four. Busy indicating potential is also placed on the selected idle test lead to prevent selection of the register junctor by another marker. The six output leads, which correspond to the six R matrices, are taken through contacts of relay LNK to control the relay trees 615, 616 and 621–624 to select the group of input leads to each corresponding to the selected R matrix. A signal is also supplied via one of three conductors in line 631, depending on the R matrix selected, to a link grouping unit 516. Selection of an R matrix narrows the selection of a route down to 20 originating junctors connected to the horizontal terminals thereof. The 20 idle test leads from these originating junctors are connected through relay tree 615 to inputs of the route selector 502.

The sequence next enables the units scanner in line identifier 501 to complete the identification of the calling line and enable relay tree 414, so that the P lead from the calling line is now connected through relay trees 412 and 414 to circuits 402.

The C conductors of the 30 BC links connected to the selected hundreds group have been connected through relay tree 512 to the link grouping unit 516. Twenty of these leads corresponding to links extending through the C matrix to the twenty selected originating junctors are connected under control of signal on the conductors 631 to the route selector 502. The leads from busy links have a negative potential thereon. The C conductors from the six AB links on the A matrix to the calling line have been connected through relay tree 413 to unit 516. Each of these six links which is busy makes five of the BC links unavailable, and therefore negative potential is applied to these BC link C leads in unit 516. The route selector 502 is now enabled by the sequence circuits to search for coincidence of an available originating junctor and an available BC link, and to select the corresponding route by a signal on one output lead in a group of five and another output lead in a group of four. These output leads are connected through contacts of relay LGA to control relay tree 617.

The sequence circuits now supply a signal to operate relay LR, to remove negative battery potential and apply ground potential to the P leads of all line circuits having their line relays operated.

The sequence control now enables the send receive circuit 603 which receives the identity of the calling line from the line identifier 501. The send receive circuit is connected via the three leads TR, RR and BY through relay trees 622–624 to the register junctor. The BY lead is used for control and the information signals are sent via leads TR and RR.

The connection is next established by various relay drivers being operated responsive to signals from the sequence circuits 401. A path then extends from negative battery potential through a registor and contacts of relay drivers 431, 432 and 433, relay trees 414 and 412, the operate windings of the crosspoint relays via a unique path through the A, B, and C stages of the switching network, relay trees 616 and 617, and the contacts of relay driver 551 to ground. The connection also extends from negative battery potential through a resistor and relay tree 621, thence via the operate winding of the crosspoint in the R matrix to the ground potential on the horizontal P lead. A hold path is energized by a ground signal (not shown) supplied from the register junctor via the hold winding of the crosspoint in the R matrix in series with relay JA in the originating junctor. Ground via contacts of relay JA extend through a resistor and the hold windings of the operated crosspoints in the C, B and A matrices in series with the cutoff relay in the line circuit. Operation of the cutoff relay releases the line relay, and also connects ground from lead BCO to the P conductor of the line terminal thereby marking the line busy. The marker verifies that the line has been made busy by checking for the ground potential on a P lead extending through the relay trees 412 and 414 and thence through a diode and resistor to lead LD–0. Ground potential on this lead makes the signal BSY true in the sequence circuits 401, and the marker is then released.

For a terminating call the group selector seizes a terminating junctor by ground on the EC lead to operate relay 8S. Contacts of relay S place negative potential on the idle test lead IT back to the group selector, and at the other side of the terminating junctor connects negative potential to the lead P to the vertical terminal of the E matrix. This negative potential extends through the pull winding of the E matrix and via break contacts of relay LGH to lead TC1 to the allotter. When the marker is idle the allotter recognizes the call on lead TC1 to apply a signal via lead LG1 to operate the relay LG in the corresponding line group. A signal is also supplied by the allotter to the sequence and supervisory circuits 401 to cause the marker to start the terminating call sequence. A signal is supplied via contacts of relay LG to operate relay LGH. The P lead from one horizontal terminal of each of the E matrices is now connected through make contacts of relay LGH to the terminating selector 602, and at the same time the break contacts disconnect these P leads from the lead TC1. The terminating selector 602 is then enabled to select one of the E matrices and supply an output signal to one of the leads in group J and one of the leads in group K. These 8 output leads are taken through contacts of relay LGH to relay trees 610, 612 and 614. The sequence circuits supply a signal on lead S14 to operate a relay driver, which supplies ground through relay tree 610 to one of 8 leads corresponding to the selected E matrix, which in turn operates and locks the relay trees 613, 611, 514 and 513. A signal is also supplied to one of the three conductors in group 631 in accordance with the selected E matrix to the link grouping circuit 516.

Fifteen B leads from the verticals of the selected E matrix are now connected through relay tree 611 to inputs of the terminating selector 602, which is again enabled to select the lead on which the call appears and to place a signal on one of the output leads in group J and one in group K, which this time operates the relay trees 612 and 614.

Ground potential through contacts of relay AZ and relay trees 614 and 613 is extended to the lead TJ of the selected terminating junctor to operate the relay TJS therein. This connects the terminating junctor to the send receiver circuit 603. Signals are now received from the sender via the T and R leads from the group selector and thence through the contacts of relay TJS to leads TC and RC to the send receive circuit. The identity of the called line is extended from the send receive circuit 603 to the line identifier 501 and supplied to the outputs of the hundreds, tens and units scanners. Party identification information is also supplied from the send receive circuit 603 via leads A, B, C and D to the terminating junctor and via contacts of relay TJS operate and lock one or more of the relays 7A, 7B, 7C and 7D in accordance with the party identification code. Output signals from the line identifier operate the relay trees 412, 413 and 414.

The busy test of the called line is now made. The P lead at the line terminal extends through relay trees 412 and 414 and via the diode and resistor to lead LD–0. If the called line is busy ground from lead BCO extends through the diode and contacts of the cutoff relay to conductor P and appears at lead LD–0. In the sequence circuits 401 this signal will cause signal BSY to become true and supplied to the send receive circuit 603. A signal is sent from the send receive circuit back over leads TC and RC to the sender, and also ground is applied to each of the leads A, B and D to operate relays 7A, 7B and 7D in the terminating junctor causing relay BT to operate via break contacts of normal relay 7C. This causes busy tone to be applied to the calling line. The marker would then release.

If on the other hand the called line is idle the negative battery potential normally on lead LD–0 makes signal BSY false, and therefore the signal on lead BSY–0 true to operate relay driver 431. In response to the signal BSY–0 being true the sequence state is also advanced to enable the route selector 502. The C leads from the 20 horizontal terminals of the selected E matrix are connected through relay tree 513 to the route selector. The connections of the C leads from the link through link grouping circuit 516 are the same as for an originating call. The route selector is then enabled to scan and select an available route. To establish the connection a path extends from negative battery potential through a resistor and contacts of relay drivers 431, 432 and 433, relay trees 414 and 412, the pull windings of the relays in the stages A, B and D, relay trees 514 and 515, to ground via the contacts of relay driver 551. At the same time negative potential is extended from negative battery potential through a resistor and contacts of a relay driver, and thence relay trees 612 and 611 and the pull winding of the cross-point in the E matrix to the ground via relay trees 514 and 515. To hold the connection, ground extends via contacts of relay 8S and AL2 in the terminating junctor to the C conductor and thence via the hold windings of the crosspoints in the E, D, B and A stages and the cutoff relay in the line circuit. Operation of the cutoff relay extends ground from lead BCO through the diode and contacts of the cutoff relay to lead P at the line terminal. To verify establishment of the connection the marker now checks the potential on lead LD–0 and if it is at ground the signal BSY becomes true in the sequence circuits to cause the marker to be released.

SUBSCRIBER MOVES TO PARTY LINE OF DIFFERENT SWITCHING UNIT

*Crosspoint to step-by-step transfer*

Figure 9:
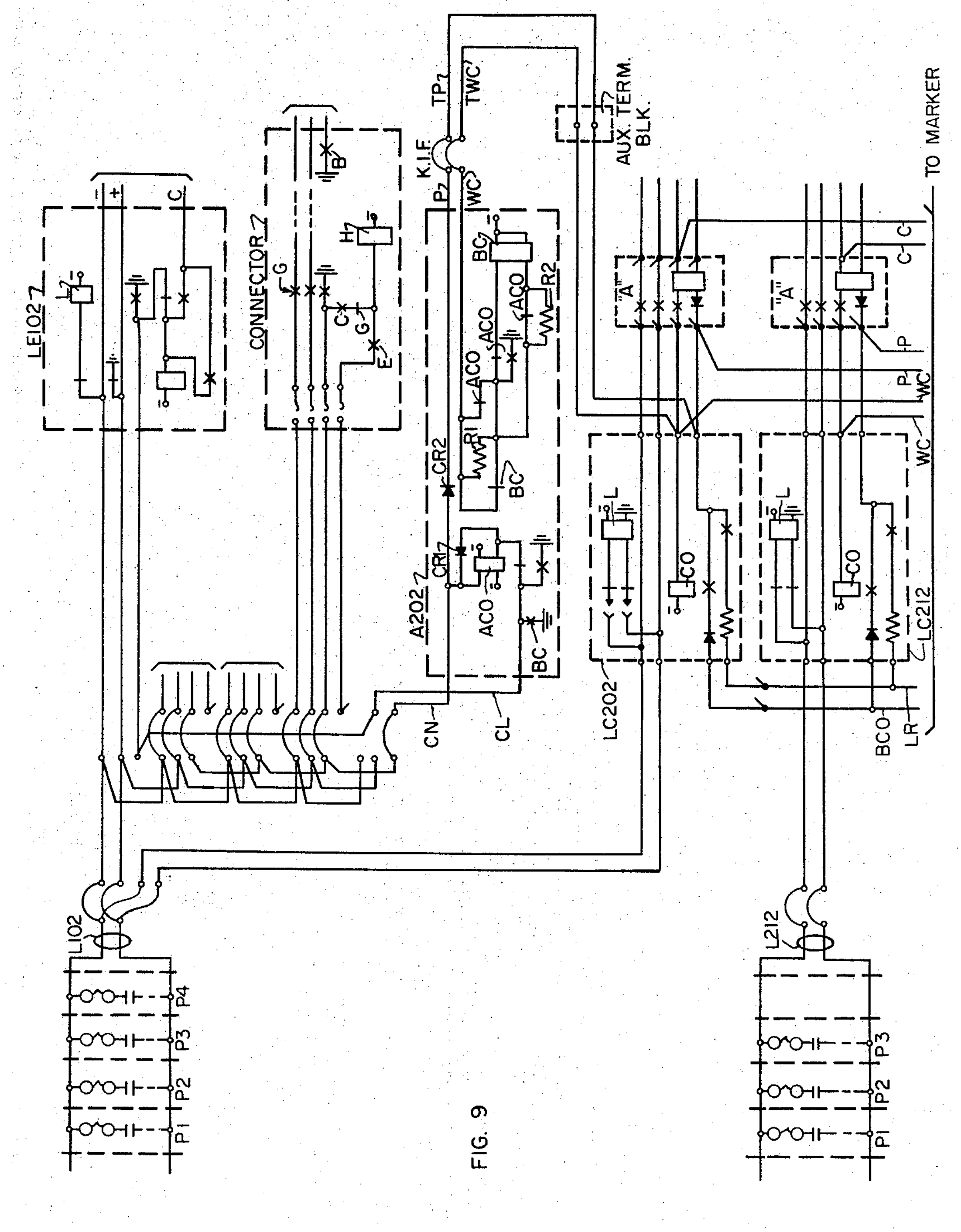
FIGS. 9 and 10 are diagrams showing subscriber moves between the step-by-step and crosspoint switching units.

The arrangement for the move of a subscriber from a common control party line to a step-by-step party line is shown in FIGS. 1 and 2, and in detail in FIG. 9. The adapter A202 comprises a relay BC and a relay ACO, two diodes, and two resistors. There are also contact spark prevention devices not shown. Leads CN and CL are connected to terminals on the line intermediate distributing frame LIDF for connection to step-by-step line terminals, and leads P and WC are connected to the distributing frame KIF for connection to common control line terminals. From the other side of the frame KIF the leads TP and TWC are connected via an auxiliary terminal block to the leads P and WC between the line circuit and the marker. The auxiliary terminal block may provide for example six pairs of terminals per 100 lines.

Note that the adapter leads TP and TWC are connected via the auxiliary terminal block only to the leads P and WC which extend from the crosspoint line terminal to the marker, and that therefore the printed wiring of the line terminal card (which includes the line circuit and the A matrix) does not need to be disturbed. This is a very important consideration, and a severe design restriction.

A few of the common control line terminals are reserved for use in transfers of subscribers from a common control party line to a step-by-step party line. These reserved line terminals have their line relay disconnected, since the line circuit of the step-by-step line is to be used for originating calls.

Assume that a subscriber having a station on the crosspoint line L212 moves to a location served by step-by-step line L102. This subscriber is assigned a reserved line terminal with line circuit LC202 and is assigned station equipment having a ringer tuned to a frequency that is not used by one of the other subscribers previously served by line L102. The information for this subscriber's directory number on the translator drum is changed to provide an equipment location number designating the line terminal LC202 and the ringing frequency assigned to it on the new line. At the main distributing frame the T and R conductors from line circuit LC202 are jumpered to the outside line L1-02. The auxiliary equipment adapter A202 is selected and its P and WC conductors are connected by way of the distributing frame KIF via conductors TP and TWC and an auxiliary terminal block to the P and WC leads connecting line circuit LC202 to the marker. As already noted the line relay in line circuit LC202 is disconnected. At the line intermediate distributing frame LIDF at the party bunching block for line L102 the control lead conductor is disconnected on the vertical side of the frame between the line equipment LE102 and the connector terminals. The leads CN and CL from adapter A202 terminates on the horizontal side of the frame. A jumper from the terminal CL is connected to the control conductor C to the line equipment LE102, and a jumper from the terminal for lead CN is connected to the control conductor of the connector terminals at the bunching block on the vertical side of the frame.

In operation on an originating call either from one of the previous subscriber stations on the line or the new subscriber station, when the subscriber lifts his handset and closes the loop the line relay in equipment LE102 operates to initiate the line finder operation, and places ground on lead C which extends via lead CL to the adapter A202 and thence via break contacts of relay ACO and diode CR1 to lead CN, and from there via diode CR2 and lead TP to the conductor P of line circuit LC202 to immediately mark this line busy to the marker. Ground on lead CN via the bunching block at the frame LIDF also marks the line busy to the step-by-step connectors. The ground is also applied to both windings of relay ACO, but this relay is differentially wound and therefore does not operate.

When a terminating call to the new station on line L102 is received it is routed via the common control equipment to line circuit LC202, and the connection is established via the A, B, D and E crosspoint stages between the line circuit LC202 and the terminating junctor, the connection being established via the pull windings, and held by ground on the conductor C at the terminating junctor which operates the cutoff relay in line circuit LC202. In the adapter A202 relay BC also operates over both of its windings in parallel via a connection through break contacts of relay ACO to lead TWC in parallel with relay CO in circuit LC202. Ground from the X contacts of relay BC is applied directly to lead CL to operate the cutoff relay in line equipment LE102, and is also applied via break contacts of relay ACO and diode CR1 to lead CN to make the line busy to the step-by-step connectors. Again this ground is also applied to the two windings of relay ACO which being differentially wound does not operate.

When a terminating call to one of the original stations on line 102 is received, it is made via the step-by-step connector terminal assigned to that station. When the connector has completed the busy test and applies ground to the control conductor C this ground extends via lead CN and is immediately applied via diode CR2 and lead TP to the P conductor of line circuit LC202 to mark the terminal busy in the common control marker. Relay ACO operates via its upper winding from the ground on lead CN and applies ground via its make contacts and break contacts of relay BC to lead TWC to the control conductor C between the cutoff relay and the A matrix, shunting the matrix for about fifteen milliseconds in case the matrix was already starting to operate for a call directed to the new subscriber on line L102. Relay BC operates via its lower winding in series with resistor R2, and after approximately fifteen milliseconds opens its break contacts, so that the cutoff relay in line circuit LC202 is held operated in series with resistor R1 to make contacts of relay ACO. When relay ACO originally operated, its X make contacts applied ground potential to lead CL to operate the cutoff relay in line equipment LE102.

*Step-by-step to crosspoint transfer*

Figures 10, 11, 12:
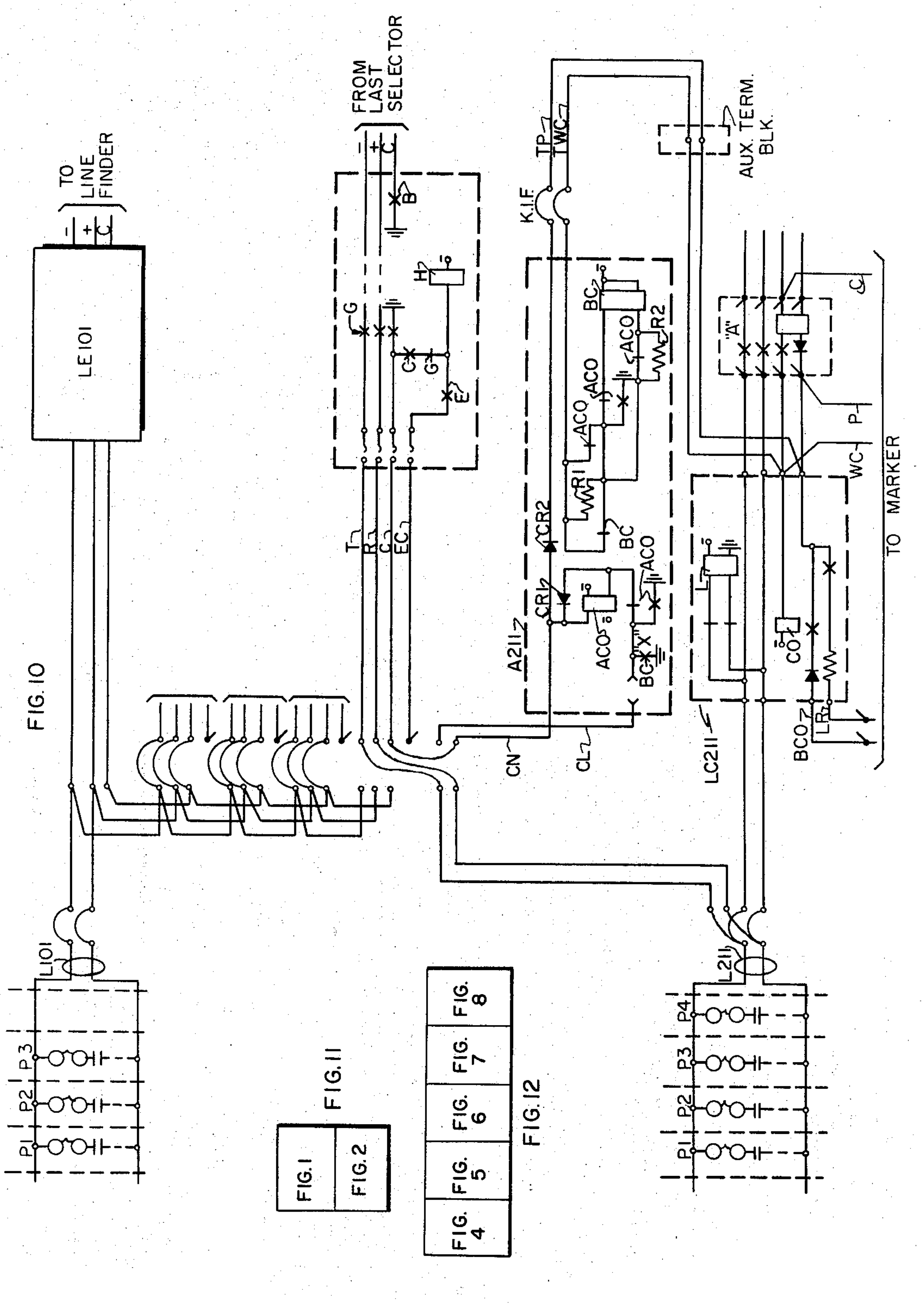
FIG. 11 shows how
FIG. 12 shows how

The arrangement for the move of a subscriber from a step-by-step party line to a common control party line is shown in FIGS. 1 and 2, and in detail in FIG. 10. For example assume that the subscriber on step-by-step line L101 moves to a location served by the common control line L211. At the intermediate distributing frame LIDF the three-conductor jumper between the connector terminal on the horizontal side of the party line bunching block on the vertical side is removed. The T and R terminals from the connector terminal on the horizontal side of the frame are connected by a two-wire jumper to the vertical side to a tie cable to the main distributing frame MF, and frame MF a two-conductor jumper is connected from the terminals of this tie cable to the terminals of outside line L211. At frame LIDF the C conductor on the horizontal side from the connector terminal is connected via a single wire jumper to a terminal which is connected via lead CN to an adapter A211. The lead CL of the adapter is not used. The TP and TWC leads of the adapter A211 are connected via distributing frame KIF and the auxiliary terminal block to the P and WC conductors connecting line circuit LC211 to the marker. The moved station is assigned an unused frequency on line L211, and at the LIDF horizontal side the lead EC is connected to the corresponding ring control conductor on the ring control bunching block.

In operation, an originating call from any station on line L211 operates the line relay of line circuit LC211 to place negative battery potential from the common conductor LR via the resistor and make contact of the line relay to lead P, the negative potential being transmitted to the marker via the pull conductor through the switching matrices as a call request signal. When the connection is established through the A, B, C, and R matrices to a register the cutoff relay in line circuit LC211 operates to disconnect the line relay and mark the line busy. Relay BC in the adapter A211 operates in parallel with the cutoff relay to transmit a ground potential via the X contacts of relay BC and break contacts of relay ACO and thence via diode CR1 to the conductor CN to make the line busy at the connector terminals.

When a terminating call to one of the original common control stations on line 211 is received via the common control system switching network, relays CO in line circuit LC211 and BC in adapter A211 operate in parallel to mark the circuit busy in the same manner as on an originating call.

On a terminating call received at the connector of the transfer station ground placed by the connector on lead C is received in the adapter on lead CN and extended via diode CR2 to the P lead in line circuit LC211 to immediately mark the terminal busy, and the ground on lead CN also operates relay ACO via its upper winding. Ground is extended via contacts of relay ACO to lead WC to shunt the switching network for fifteen milliseconds in case the matrix was starting to operate in response to a terminating call via the common control system, and then relay BC operates in series with resistor R1, so that the cutoff relay in line circuit LC211 is then held in series with resistor R2.

CALL TRANSFER SERVICE BETWEEN TWO PRIVATE LINES

For subscribers having two private lines such as a business line and a residence line, arrangements comprising relay circuits for use of the exchange are available for causing calls received at one line to be diverted to the other line. See for example U.S. Patent 2,095,712 issued Oct. 12, 1937, to E. S. Peterson for a Telephone System, and U.S. Patent 3,041,405 issued June 26, 1962, to C. E. Lomax for a Line Circuit With Two-Way Transfer. If in the exchange as shown in FIGS. 1 and 2, one of these lines is a step-by-step line and the other is a common control crosspoint line, the adapter shown in FIGS. 9 and 10 may be used along with the transfer relay circuit to provide this transfer service.

While we have described above the principles of our invention in connection with specific apparatus, it is to be clearly understood that this description is made only by way of example and not as a limitation to the scope of our invention.

This is one of several copending patent applications listed in Patent No. 3,170,041 by K. K. Spellnes at columns 33–35, and in particular is mentioned in column 35, lines 51–56. That list is incorporated herein and made a part hereof as though fully set forth. Several features disclosed in the present application were invented by others, some of which are claimed in the applications in said list in the Spellnes patent.

What is claimed is:

1. In a communication system, an enxchange comprising first and second switching units, each said unit having a plurality of subscriber lines, including party lines connected thereto, and said first unit including connector switches of the terminal per station type while said second unit has marker controlled line stages of the terminal per line type and common control means for said markers which provide for translation of the subscriber directory numbers, the line terminals of both said units terminating sets of conductors including control conductors, and comprising apparatus for facilitating the move of a station from a line connected to one of said units to a line connected to the other unit without change in directory number, said apparatus including adapter means connectible between control conductors of the corresponding terminals of one and the other unit to repeat a busy mark at either terminal to the other terminal.

2. In a communication system, the combination as claimed in claim 1, wherein the line terminals of said second switching unit have two control conductors, a hold conductor and an operate conductor, the busy mark being applied on the operate conductor, the marker having means to make a connection to the operate conductor of a selected line terminal to make a busy test of the line terminal, the same connection to the operate conductor being also used in establishing a connection through a switching network, the connection being held via a connection through the switching network to the hold conductor which causes the busy mark to be applied to the operate conductor;

and wherein said adapter means includes an arrangement to apply a busy mark to the operate conductor of the second-unit line terminal in response to the busy mark on the control conductor of the first-unit line terminal, and means responsive to a hold connection to the second-unit line terminal to apply a busy mark to the control conductor of the first-unit line terminal.

3. In a communication system, the combination as claimed in claim 2, wherein at line terminals of the first switching unit a first-polarity potential on the control conductor indicates an idle condition and said busy mark comprises a second-polarity potential;

wherein at said second switching unit line terminals, closing of the subscriber line loop to initiate a call causes a first-polarity potential to be applied to the operate conductor as a service request signal;

and wherein the arrangement in said adapter means includes a diode conected between the control conductor at the first switching unit and the operate conductor at the second switching unit, the diode being forward biased for second-polarity potential at the first switching unit control conductor with respect to the second switching unit operate conductor; whereby idle indicating potential at the control conductor of the first switching unit does not appear as a call request on the operate conductor at the second switching unit.

4. In a communication system, the combination as claimed in claim 1, wherein said exchange includes means for establishing revertive calls between two stations on the same party line, including mixed party lines serving stations of both the first and the second switching units.

5. In a communication system, an exchange comprising first and second switching units, each said unit having a plurality of subscriber lines connected thereto, a direct-current source having a first pole and a second pole;

said first switching unit having line terminals, each of which has two conductors for connection to one of said subscriber lines and a control conductor for connection through the winding of a cutoff relay to said first pole, second-pole potential on the control conductor being a busy mark which operates said cutoff relay, the three conductors being respectively connected in multiple to outlets of a plurality of connectors, each connector having means responsive to call signal pulses to selectively operate to one of its outlets, means to connect a busy test relay to the control conductor to test for said second-pole potential, and means responsive to the absence of the last said potential to seize the line terminal and apply second-pole potential to the control conductor;

said second switching unit having line terminals, each of which has two conductors for connection to one of said subscriber lines, control conductor means comprising a hold conductor connected to a cutoff relay and an operate conductor, the busy-guarding potential being second-pole potential on the operate conductor, a switching network and marker, means in the marker effective during a terminating call after receipt of call signals designating a line terminal to establish a by path connection to the operate conductor at the designated line terminal and to test for said second-pole potential, means responsive to the absence of said potential to select a path in said switching network and apply potentials to the operate conductor at the line terminal and at the other end of the network to establish the connection and apply a hold path through the network to the hold conductor at the line terminal to operate the cutoff relay, second-pole potential being connected via contacts of the cutoff relay to the operate conductor to thereby mark the line busy;

a mixed subscriber line connected to the two line conductors of both a first switching unit line terminal and a second switching unit line terminal, and apparatus connectible between the control conductor of the first unit line terminal and the control conductor means of the second unit line terminal to repeat a busy mark at either terminal to the other terminal.

6. In a communication system, the combination as claimed in claim 5, wherein said first-pole potential on the operate conductors of idle line terminals of the second switching unit constitute service request signals;

and wherein said apparatus includes a diode connected between the control conductor of the first-unit line terminal and the operate conductor of the second-unit line terminal forward biased for second-pole potential at the control conductor of the first unit, whereby first-pole potential from the cutoff relay of an idle first-unit line terminal does not appear as a service request signal at the second-unit line terminal.

7. In a communication system, the combination as claimed in claim 6, wherein said apparatus further includes an auxiliary cutoff relay which operates in response to the seizure by a connector of the first unit applying second-pole potential to the control conductor thereat, and a connection from the hold conductor of the second-unit terminal via contacts of the auxiliary cutoff relay to operate the cutoff relay at the second-unit terminal.

8. In a communication system, the combination as claimed in claim 7, wherein the second unit line terminal includes a line relay which is connected to the subscriber line via normally closed contacts of its cutoff relay, the line relay having a set of normally open contacts for applying first-pole potential to the operate conductor in response to the initiation of the call at the line;

and wherein said auxiliary cutoff relay includes two similar windings the first winding being energized in response to said second-pole potential from the control conductor of the first unit, and means including a diode connected between the two windings of the auxiliary cutoff relay to energize both windings thereof differentially and thereby prevent its operation in response to a call established via the switching network of the second switching unit.

9. In a communication system, the combination as claimed in claim 5, wherein said apparatus includes a diode having its anode connected to the control conductor of the first unit terminal and its cathode connected to the operate conductor of the second unit terminal to repeat a busy mark at the first terminal to the second terminal.

10. In a communication system, the combination as claimed in claim 9, wherein said apparatus further includes a first auxiliary relay having a winding connected to the control conductor of the first-unit terminal to operate in response to a second-pole potential thereon applied for a terminating call by one of said connectors, a second auxiliary relay having two similar windings, a connection from the hold conductor of the second unit terminal via the parallel combination of a resistor, normally closed contacts of the first auxiliary relay, and normally closed contacts of the second auxiliary relay to a junction point, a connection from the junction point via normally open contacts of the first auxiliary relay to said second pole, so constructed and arranged that in response to second-pole potential on the control conductor of a first-unit terminal from a connector seizing the terminal second-pole potential is applied via the contacts of the first relay to the junction point and thence to the hold conductor of the second terminal to thereby shunt the switching network for a given interval to cause release of the network in case it was already operating in response to another call, a connection from the second winding of the second relay via the parallel combination of a second resistor and normally closed contacts of the first relay to the junction point, the second relay being operated via its second winding in series with the second resistor to open its normally closed contacts at the end of said given interval so that the second-pole potential from the junction point via the first resistor operates the cutoff relay at the second-unit terminal.

11. In a communication system, the combination as claimed in claim 10, wherein said first auxiliary relay includes a second winding similar to its first winding connected via a series path through a normally closed set of its own contacts and normally open contacts of the first relay to said second pole, a second diode having its cathode connected to said first-unit control conductor and its anode connected to the second winding of the first relay, a call via said second switching unit to the terminal of said mixed line applying potential via the hold path through the network to the hold conductor at the line terminal completing a path via contacts of said auxiliary relays to the junction point and then via contacts of the first relay to the two windings of the second relay to cause it to operate and close its normally open contacts to thereby extend second-pole potential via normally closed contacts of the first relay and said second diode to the control conductor of the first terminal to mark it busy, the first relay remaining unoperated because its windings are energized differentially.

12. In a communication system, the combination as claimed in claim 11, wherein the second-unit line terminal of said mixed line includes a line relay connected via normally closed contacts of its cutoff relay to the subscriber line, and said first auxiliary relay replaces the cutoff relay of the first line terminal.

13. In a communication system, the combination as claimed in claim 11, wherein only said first switching unit has a line relay connected via normally closed contacts of its cutoff relay to said mixed line, the connection from the last said cutoff relay being disconnected from the control conductor of the connector terminal and connected to the said normally open contacts of the second relay of said apparatus, whereby a call originating on said line causes the line relay to operate and seize originating equipment in the first switching unit which in turn supplies second-pole potential to operate the cutoff relay, which potential is extended via normally closed contacts of the first auxiliary relay and the said second diode to the control conductor at the connector terminal and also via the first said diode to the operate conductor at the second unit terminal; a normally closed set of contacts of the first auxiliary relay connected between the second pole and said cutoff relay of the first unit being operated in response to a call from a connector which operates said first auxiliary relay; and in response to a call via the switching network of the second switching unit the cutoff relay of the first unit is operated via said normally open contacts of the second auxiliary relay.

References Cited

UNITED STATES PATENTS

| | | | |
|---|---|---|---|
| 2,556,103 | 6/1951 | Peterson et al. | 179—27 |
| 2,826,639 | 3/1958 | Pharis | 179—17 |
| 2,848,546 | 8/1958 | Pharis | 179—16 |

KATHLEEN H. CLAFFY, *Primary Examiner.*

WILLIAM C. COOPER, *Assistant Examiner.*